US008430337B2

(12) United States Patent
Pearce, III et al.

(10) Patent No.: US 8,430,337 B2

(45) Date of Patent: Apr. 30, 2013

(54) LIGHT-ACTIVATED PORTABLE AEROSOL MIST SPRAYER DEVICE

(75) Inventors: Robert Clarence Pearce, III, Arlington, TX (US); Joseph Thomas Colarusso, Arlington, TX (US); William Pierre Boesch-Deveze, Plano, TX (US); John Ray Roheim, Flower Mound, TX (US)

(73) Assignee: NCH Corporation, Irving, TX (US)

(*) Notice: Subject to any disclaimer, the term of this patent is extended or adjusted under 35 U.S.C. 154(b) by 1273 days.

(21) Appl. No.: 11/847,505

(22) Filed: Aug. 30, 2007

(65) Prior Publication Data

US 2008/0210772 A1 Sep. 4, 2008

Related U.S. Application Data

(63) Continuation-in-part of application No. 10/970,778, filed on Oct. 21, 2004, now Pat. No. 7,306,167, and a continuation-in-part of application No. 11/228,889, filed on Sep. 15, 2005, now abandoned.

(51) Int. Cl.
*A01G 27/00* (2006.01)

(52) U.S. Cl.
USPC .............................................. 239/69; 239/457

(58) Field of Classification Search .................... 239/67, 239/69, 71, 302, 337, 349, 451, 457; 222/646, 222/649, 652, 645
See application file for complete search history.

(56) References Cited

U.S. PATENT DOCUMENTS

| | | | | |
|---|---|---|---|---|
| 1,572,568 | A | | 2/1926 | Richmond et al. |
| 3,589,563 | A | | 6/1971 | Carragan |
| 3,675,360 | A | | 7/1972 | Pierce |
| 3,739,944 | A | | 6/1973 | Rogerson |
| 3,991,939 | A | | 11/1976 | Maclay |
| 4,015,366 | A | | 4/1977 | Hall, III |
| 4,114,647 | A | | 9/1978 | Sturman et al. |
| 4,121,767 | A | | 10/1978 | Jensen |
| 4,830,791 | A | * | 5/1989 | Muderlak et al. ............. 422/116 |
| 5,038,972 | A | | 8/1991 | Muderlak et al. |
| 5,303,866 | A | | 4/1994 | Hawks, Jr. |
| 5,585,626 | A | | 12/1996 | Beck et al. |
| 5,715,866 | A | * | 2/1998 | Granger ................... 137/624.11 |
| 5,763,873 | A | | 6/1998 | Beck et al. |
| 5,772,074 | A | | 6/1998 | Dial |

(Continued)

OTHER PUBLICATIONS

American Microsemiconductor, Triac, at least as early as Oct. 19, 2004.

*Primary Examiner* — Davis Hwu

(74) *Attorney, Agent, or Firm* — Ross Barnes LLP; Monty L. Ross; Robin L. Barnes

(57) ABSTRACT

A portable, light-activated, mist sprayer system comprising direct current power supply, an ambient light sensor, electronic circuitry that evaluates an electrical signal received from the light sensor to determine whether a "dusk" or "dawn" light condition exists; a container of treating fluid at a desired concentration; a motor and pump that are activated at the appropriate time as determined by the sensed light condition; at least one sprayer nozzle that will dispense a mist containing the treating fluid whenever the pump is operating; and a timer that turns off the pump after a preset interval to terminate the spraying cycle. A preferred utility for the system of the invention is spraying dilute solutions of insecticide or insect repellent during the periods of significant insect activity that typically occur around dusk and dawn. An RF receiving unit is also disclosed for optional activation using a remote transmitter.

21 Claims, 9 Drawing Sheets

U.S. PATENT DOCUMENTS 6,039,212 A 3/2000 Singh
6,192,621 B1 2/2001 Fain
6,216,925 B1 4/2001 Garon
6,267,297 B1 7/2001 Contadini
6,409,093 B2 * 6/2002 Ulczynski et al. ................ 239/1
6,540,155 B1 4/2003 Yahav
6,756,578 B1 6/2004 Kaiser
6,874,707 B2 4/2005 Skinner
6,957,780 B2 10/2005 Rosa
6,978,794 B2 12/2005 Dukes
7,097,113 B2 8/2006 Ivans
2005/0211796 A1 9/2005 Lovett
2005/0224596 A1 10/2005 Panopoulos
2005/0284951 A1 12/2005 Clarke, III et al.
2006/0065886 A1 3/2006 Shi et al.
2006/0086824 A1 4/2006 Pearce, III et al.

* cited by examiner

LIGHT-ACTIVATED PORTABLE AEROSOL MIST SPRAYER DEVICE

CROSS-REFERENCE TO RELATED APPLICATIONS

This application is a continuation-in-part of, and claims priority from, U.S. patent application Ser. No. 10/970,778 filed on Oct. 21, 2004 now U.S. Pat. No. 7,306,167 and Ser. No. 11/228,889 filed on Sep. 15, 2005 now abandoned as to all subject matter contained in this application that was previously disclosed in these parent applications.

BACKGROUND OF THE INVENTION

1. Field of the Invention

This invention relates to a portable device useful for spraying a fluid mist through a sprayer head to treat the atmosphere in a desired location proximal to the device, and more particularly, to a self-contained, light-activated, pump-driven mist sprayer that initiates a flow of treating fluid in response to a sensed ambient light condition of desired intensity and duration. Once initiated, the flow of fluid mist through the sprayer desirably continues for an adjustable time interval. A preferred use of the system is for eradicating or repelling flying or crawling insects in locations remote from AC power outlets during the periods of significant insect activity that typically occur around dusk and dawn. An insect attractant, either alone or in combination with a pesticide, can also be dispensed using the subject device.

2. Description of Related Art

Problems associated with the presence of mosquitoes and other flying insects are well known, particularly during summer months when people typically engage in many outdoor activities. People have long appreciated the dangers associated with mosquito-borne diseases such as malaria and equine encephalitis. More recently, publicity associated with the West Nile virus in has heightened public awareness of dangers that can be associated with mosquito bites. Additionally, people are generally aware of the pain, discomfort and potentially dangerous allergic reactions that can accompany the bites of various flying and crawling insects encountered outdoors in either urban or rural areas.

Various chemical sprays and devices have previously been used to control flying and crawling insects, spiders, and other such pests. Chemical sprays containing environmentally acceptable concentrations of insecticides or pesticides have historically been applied using hand-held sprayers, fogging machines, and the like. Such sprays are sometimes applied by governmental agencies in parks, residential neighborhoods and other high-risk urban areas, but are most often applied by individuals using hand-held sprayers in and around their own homes and yards. In more rural settings, sprayer systems have previously been used to spray insecticides or pesticides in and around barns, livestock holding areas, and the like. Other devices that have previously been used to control insects and other pests have incorporated a lure or an attractant, such as food baits, light, pheromones, or carbon dioxide, to draw the insects or pests to a trap, electrically energized grid, or poison.

Some chemical sprays that are used to control flying and crawling insects and other pests have been contained in hand-held aerosol cans. Oftentimes the aerosol cans are used directly by the user to dispense the chemical sprays when desired. However, a number of devices exist that can be used to automatically discharge material from an aerosol container. They range from mechanical devices that simply actuate the aerosol can's internal valve to dispense the spray through the aerosol can's nozzle to more extensive devices that contain their own valves and nozzles. These devises are often controlled by timers to dispense the contents of the aerosol can at particular times or at predefined intervals.

Many of the prior art systems and devices for controlling insects and pests are operated directly by the user. Others are controlled by timers that are preset to initiate their function at a particular time and for a particular interval. In some cases, the electrical energy required to operate the devices, particularly those disposed in remote or rural areas where electricity is not readily available, is obtained from batteries or solar cells. U.S. Pat. No. 6,192,621, for example, discloses a pest control device for outdoor use comprising a solar-powered fan that enhances the circulation of odorous repellent to the external ambient environment. U.S. Pat. No. 5,763,873 discloses an agricultural implement for spraying herbicides on weeds that utilizes a photo-detector circuit to avoid spraying the herbicide on bare soil. The photo-detector circuit is not affected by changes in ambient lighting conditions.

In the related parent application, the contents of which are incorporated by reference herein, a system is disclosed that preferably comprises an alternating current power source, ambient light sensor, electronic circuitry that evaluates an electrical signal received from the light sensor to determine whether a "dusk" or "dawn" light condition exists; a container, reservoir or other source of treating fluid at a desired concentration; a pump that is activated at the appropriate time as determined by the sensed light condition; at least one sprayer head and, preferably, an array of spaced-apart sprayer heads, each having a nozzle that will dispense a mist containing the treating fluid whenever the pump is operating; flexible tubing or other conduits providing fluid communication between the fluid source and the sprayer heads; and a timer that turns off the pump after a preset interval to terminate the spraying cycle. The electronic control unit disclosed in the parent application comprises a light level discrimination module, a pump control module, a power supply module, a remote receiver module, and optionally, a remote transmitter for activating the pump control module.

Various solar-powered devices have previously been disclosed that utilize solar-powered batteries to store electrical energy during daylight hours for use in operating electric timers capable of turning one or more outdoor lights on and off daily and, in some cases, for powering those lights. The use of photocells for activating or deactivating a mechanical device upon receipt of light is also well known. Photocells are most often triggered by the impingement or interruption of a directed light beam and not by ambient light. U.S. Pat. No. 6,756,758 discloses receiver circuits for detecting a target light source that effectively remove "noise," including ambient daylight, during the operation of such devices. Other devices have been disclosed that turn one or more lights on or off in response to predetermined levels of ambient light.

U.S. Pat. No. 4,015,366 discloses a highly automated agricultural production system comprising a weather sensor package used to measure weather conditions, including the sunlight energy spectrum, the intensity of which is measured using a plant growth photometer said to be available from International Light, Inc. The system is said to optionally include a fluid delivery system useful in controlling insects and diseases, but is complex and not desirable for home use.

Mosquitoes, flies and other insects are most easily controlled when they are most active, often during the time around sunrise and sunset. The use of timers alone to activate spraying or misting systems is often inadequate for initiating spraying at the onset of the relatively short periods when such pests are most active. Timers alone are not responsive to variations in daylight hours, weather conditions and topography that can all affect ambient light levels and insect activity at a particular time of day in a particular location.

Notwithstanding the systems and devices previously disclosed, a mist sprayer system is needed that is portable and does not require an AC power source, that will activate automatically at dusk or dawn and spray for a preset interval, that can optionally be activated manually or by using a remote transmitter, and that will be effective for eradicating or repelling flying and crawling insects, spiders and the like from outdoor areas in which the system is deployed. A portable mist sprayer system is also needed that can be easily inserted into any of a variety of desired carrier devices, such as, for example, a simulated lamp, lantern or decorative torch.

SUMMARY OF THE INVENTION

The present invention is a portable, self-contained, mist sprayer system that preferably comprises a direct current power supply, an ambient light sensor, electronic circuitry that evaluates an electrical signal received from the light sensor to determine whether a “dusk” or “dawn” light condition exists; an aerosol container of treating fluid at a desired concentration; an actuator that opens the aerosol container’s internal valve for a predetermined period at the appropriate time as determined by the sensed light condition; and at least one sprayer nozzle that will dispense a mist containing the treating fluid whenever the aerosol can’s valve is opened. According to a preferred embodiment of the invention, the electronic control unit comprises a light level discrimination module, an actuator control module, and optionally, a remote transmitter for activating the actuator.

One preferred application for the system is for spraying a mist comprising a treating fluid useful for eradicating or repelling flying or crawling insects such as mosquitoes, wasps, bees, spiders, and the like, that may be injurious to humans or livestock. Examples of outdoor areas that can be serviced by the systems of the invention include, for example, residential or commercial yard and patio areas, swimming pools, outdoor restaurants, horse and livestock barns, garbage dumpsters and compactors, food processing plants, parks and picnic areas, boat houses, dog kennels, zoos, amusement parks, industrial sites, and the like. Systems of the invention can similarly be used for controlling insects and the diseases they carry in vineyards, vegetable fields, orchards, greenhouses, nurseries and such, or for repelling dogs and wild animals such as foxes, squirrels, rabbits, and the like, that can become pests in gardens or other restricted areas. The portable mist sprayer system of the invention can desirably be installed and used in a variety of different carrier devices such as, for example, a torch, lamp or lantern.

The system of the invention can be easily, effectively and reliably used to dispense a variety of treating fluids, most preferably liquids, but optionally, gases or liquids containing dissolved, entrained or suspended gaseous or powdered solid components. The treating fluids are preferably dispensed as a mist, and are preferably selected from known, commercially available insecticides, pesticides, insect or pest repellents, fungicides, biocides, and the like, and can optionally include an attractant component as a lure. It will also be appreciated upon reading the disclosure that the subject system can likewise be used for dispensing other treating fluids “on demand” including, for example, liquid fertilizers, air fresheners, cooling water, and the like, and at times other than dusk and dawn.

The system of the invention replaces standard timers or programmed controllers previously used in automated dispensing systems, and, because the dispensing cycles are triggered by prevailing ambient light levels, will typically operate only during the times when flying and crawling insects and pests are most active. By automatically initiating chemical treating for defined intervals during the periods of greatest insect activity, the user is able to reduce the amount of treating fluid required, and to thereby achieve better results at lower cost. The system is automatically responsive to use in various time zones and topographies, and will automatically adapt to the lengthening and shortening daylight hours that are normally associated with seasonal changes. In addition to having an automatic light-activated capability unlike that of other known portable sprayer systems and devices, the mist sprayer system of the invention can also be activated manually or by using a wireless remote transmitter if desired

BRIEF DESCRIPTION OF THE DRAWINGS

The apparatus of the invention is further described and explained in relation to the following drawings wherein.

DESCRIPTION OF THE PREFERRED EMBODIMENTS

Figure 1:
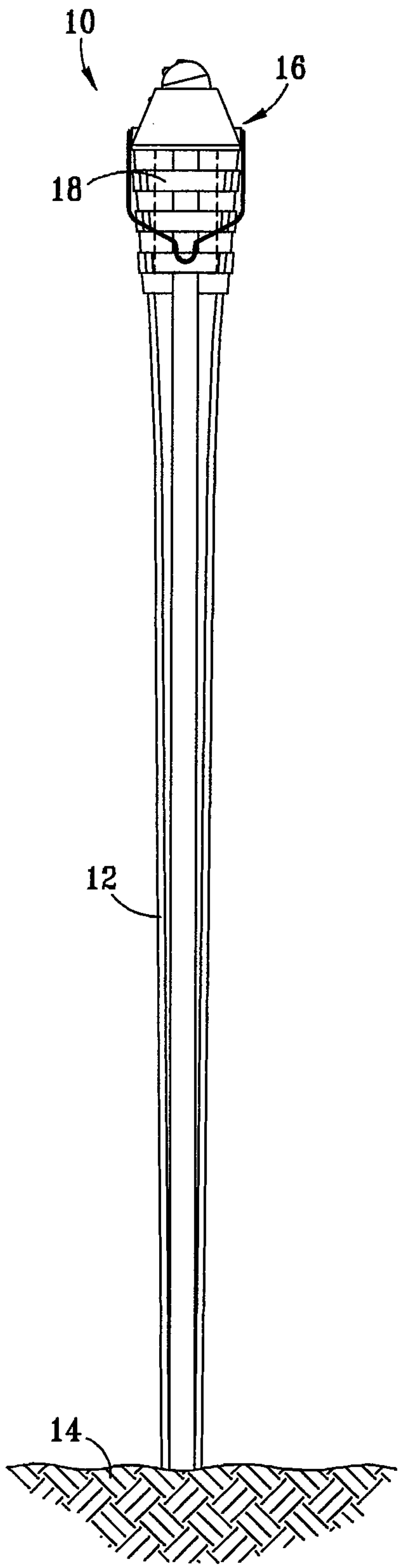
FIG. 1 is a front elevation view of a simulated torch having a preferred embodiment of the portable, light-activated mist sprayer system of the invention installed in it.
Figure 2:
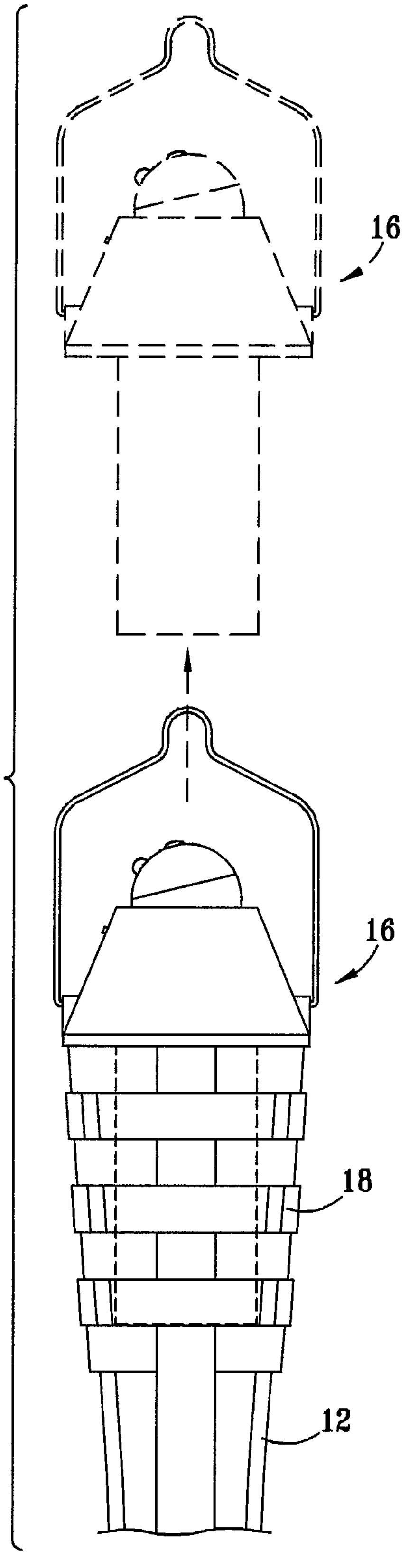
FIG. 2 is an enlarged front elevation view of the upper portion of the portable light-activated mist sprayer system of the invention as installed in the simulated torch carrier device, with the portable mist sprayer system also being depicted in dashed outline as it would appear if removed from the torch carrier device.

Referring to FIG. 1, a simulated tiki torch 10 is depicted that further comprises an upright shaft portion 12 inserted into ground 14 and having attached to its top a basket portion 18 supporting a portable, light-activated mist sprayer system 16 of the invention. Simulated tiki torch 10 is one of many different types of carrier portable devices that can be used as a stand to support portable, light-activated mist sprayer system 16. Referring to FIG. 2, portable, light-activated mist sprayer system 16 is again depicted in solid outline as installed in the top of basket 18 over shaft portion 12, and is also depicted in dashed outline as it would appear if removed from basket 18. Alternatively simulated tiki torch 10 can be composed of just the top basket portion 18 and have a screw adapter to allow a separate shaft portion 12 to be attached to basket portion 18.

Figure 3:
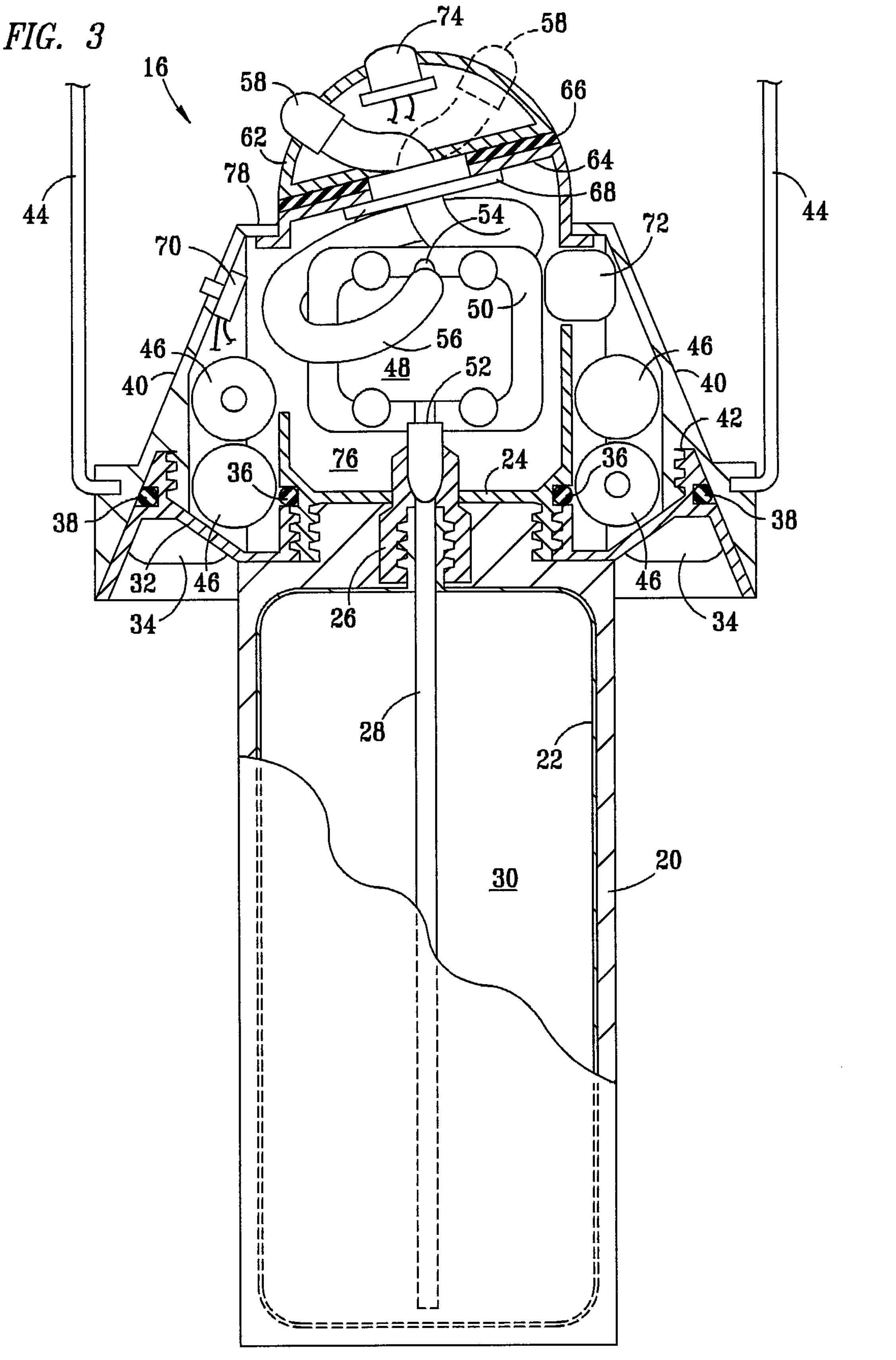
FIG. 3. is an enlarged front elevation view, partially in cross-section and partially broken away, of the portable, light-activated mist sprayer system of FIG. 2, with the door opened.
Figure 4:
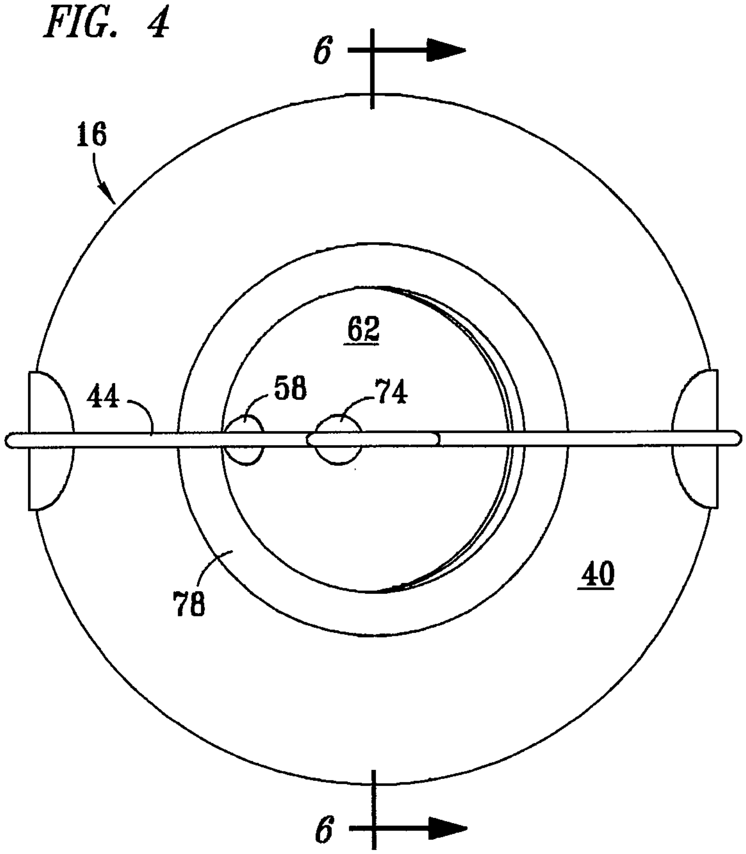
FIG. 4 is a top plan view of the portable, light-activated mist sprayer system of FIG. 2.
Figure 5:
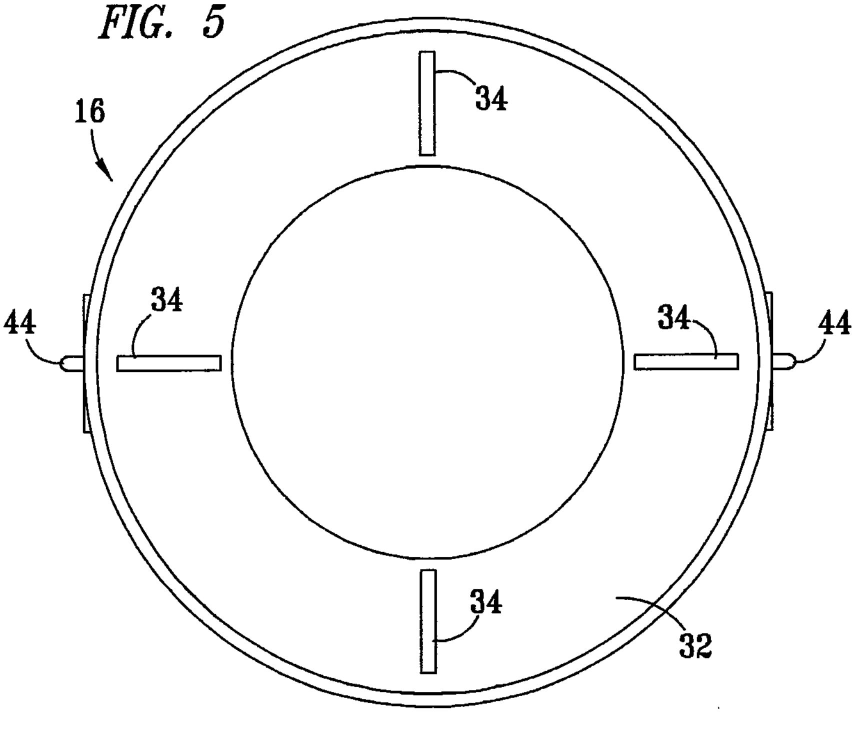
FIG. 5 is a bottom plan view of the portable, light-activated mist sprayer system of FIG. 2.
Figure 6:
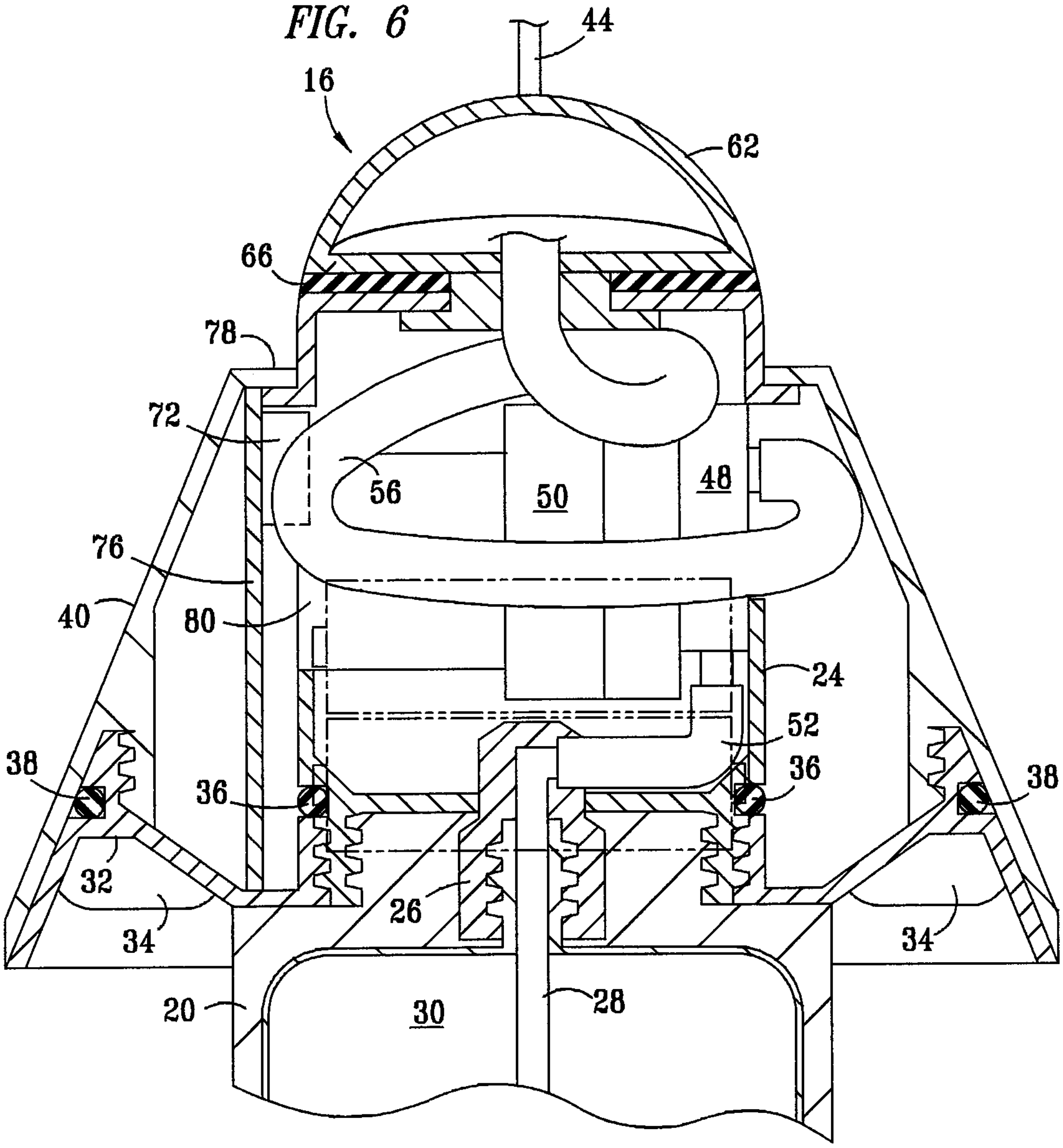
FIG. 6 is a cross-sectional front elevation view, partially broken away, taken along line 6-6 of FIG. 4.

FIGS. 3-6 depict in greater detail the construction and internal and external elements of a preferred portable, light-activated mist sprayer system 16 of the invention. Mist sprayer system 16 has an upper portion comprising a mist sprayer assembly and a lower portion comprising bottle 20 that preferably threads into engagement with the underside of frame 24 of the sprayer assembly. Referring to FIG. 3, the mist sprayer assembly further comprises as principal elements frame 24, ring 32, collar 40, rotatable dome 62, printed circuit board 76, batteries 46, pump 48, motor 50, pump inlet line 52, pump outlet 54 and outlet line 56, spray nozzle 58, switch 70, RF receiver 72 and light sensor 74. Bail 44 is attached to collar 40 for use in lifting and handling portable mist sprayer system 16.

Printed circuit board 76, pump 48 and motor 50 are all preferably mounted on frame 24. Ring 32 is desirably threaded onto the bottom of frame 24 and tightened using downwardly projecting, circumferentially spaced twist grips 34. Batteries 46, preferably four 1.5 volt cells, are disposed in recesses at opposite sides of ring 32, and are contained in that position by the interior walls of collar 40, which is threaded into engagement with the upwardly extending portion of ring 32. Sealing rings 36, 38 are provided in annular grooves on the outside of the lower portion of frame 24 and on the outwardly facing surface of ring 32, respectively. Motor 50 is preferably a 6-volt DC motor with a gear box driving pump 48. Batteries 46, RF receiver 72 (for use with an associated remote transmitter, not shown), switch 70 and light sensor 74 (preferably a cadmium sulfide sensor) are each connected to printed circuit board 76, although the wires and electrical connections are not all depicted in order to simplify the drawings. Dome 62 is preferably rotatably mounted above pump 48 and motor 50 by means of a retainer flange 68 disposed beneath inclined dome base 64. Because dome 62 is rotatably mounted on inclined dome base 64, both the radial spray direction and the vertical spray angle of spray nozzle 58 can be adjusted by rotating either dome 62 or the entire mist sprayer system 16. An alternate position for spray nozzle 58 when it and dome 62 are rotated relative to dome base 64 is shown in dashed outline in FIG. 3. Alternatively, more than one spray nozzle can be provided in mist sprayer system 16 provided that a suitable manifold or connector is provided at pump outlet 54. A rubber washer 66 is desirably provided between dome 62 and dome base 64 to provide some frictional holding force between the underside of dome 62 and the top of dome base 64 as dome 62 is rotated relative to dome base 64. Rubber washer 66 resists any rotational motion that might otherwise be imparted to dome 62 as pressurized spray is discharged through nozzle 58.

Container 20 is preferably a plastic or metal bottle, most preferably made of high density polyethylene ("HDPE"), that desirably contains a replaceable liner bag 22 in which treatment fluid 30 is prepackaged. Bag 22 is preferably flexible, and is most preferably made of metallized plastic. Treatment fluid 30 is preferably a liquid capable of being pumped through at least one spray nozzle 58 and into the surrounding air. Treatment fluid 30 can comprise a pesticide, insecticide, or other liquid material that can be dispensed from mist sprayer system 16 to achieve a beneficial purpose. Although a liquid, which can be atomized by spray nozzle 58, is preferred for use as treatment fluid 30, treatment fluid 30 can also be selected from gases, suspensions, and mixtures thereof. Where gas is used as treatment fluid 30, container 20 can be pressurized and pump 48 and motor 50 can be replaced, for example, by a suitable gas dispensing mechanism.

Pick-up tube 28 is preferably made of HDPE and desirably extends downwardly to a point near the internal bottom of replaceable bag 22 inside container 20 to facilitate substantially complete utilization of treatment fluid 30. Nipple 26 is threaded onto or otherwise attached to a similarly threaded neck at the top of bag 22. The top of pick-up tube 28 is desirably in fluid communication through nipple 26 with flexible tubing 52, which is attached to the inlet of pump 48, as is more easily seen in FIG. 6. The neck of bottle 20 is likewise provided with external threads or another similarly effective attachment device to permit bottle 20 to be releasably connected to the underside of frame 24.

Figure 9:
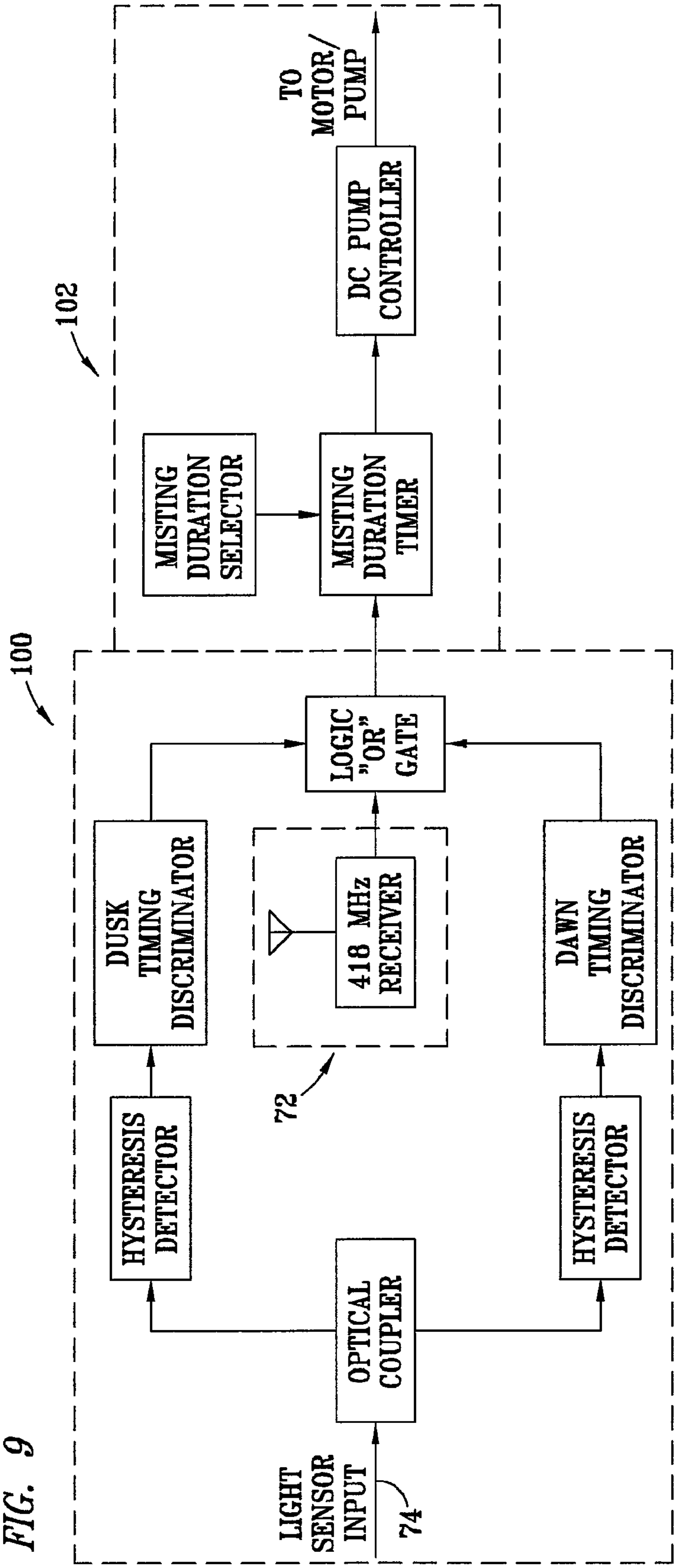
FIG. 9 is a simplified flowchart illustrating diagrammatically the various components and logic implemented in a preferred electronic control unit suitable for use in the light-activated mist sprayer system of the invention.

FIG. 9 is a simplified flowchart illustrating diagrammatically the various components and logic implemented in a preferred electronic control unit installed on printed circuit board 76 and suitable for use in the portable, light-activated mist sprayer system 16 of the invention, although it will be appreciated that other similarly effective circuitry and components can likewise be used in implementing the operational objectives of the system. Referring to FIGS. 3 and 9, in light level discrimination section 100 of portable, light-activated mist sprayer system 16, an electrical signal received from light sensor 74 (FIG. 1), a conventional, commercially available device, is received into an optical coupler. The signal is then split and fed through two parallel hysteresis detectors to insure that pump 48 is not activated by transient signals attributable to stimuli other than a gradual darkening or lightening of ambient light to a predetermined "trigger" level. So-called "dusk" and "dawn" discriminators then compare the signal being received from light sensor 74 to predetermined signal values consistent with "dusk" and "dawn" ambient light conditions.

Parallel nand gates receive the signals from the discriminators, and assuming that the pump start criteria have been met, signal pump controller module 102 to start motor 50 and pump 48. Pump controller module 102 preferably comprises a misting duration selector, a misting duration timer, and a DC pump controller. Three-way switch 70 is provided for use in turning battery power to light sensor 74 and RF receiver 72 of spray mister system 16 on or off. The third switch position activates a test circuit that operates mist sprayer system 16 for a preset interval such as about five seconds. When system 16 is powered up, motor 50 and pump 48 can be activated either by light sensor 74 or by an RF signal received from an optional remote transmitter, not shown. Ambient light sensor 74 is desirably positioned so that it is not blocked from receiving the prevailing ambient light by trees, overhangs, screening structures, or the like, although it is not necessary that it be positioned to receive direct light from the sun or another light source. When positioning portable mist sprayer system 16 and light sensor 74, care should also be given to avoiding locations where flood lights, car lights, or the like, are likely to impinge directly on the sensor, thereby impeding the ability of the sensor to monitor the prevailing ambient light conditions.

Figure 7:
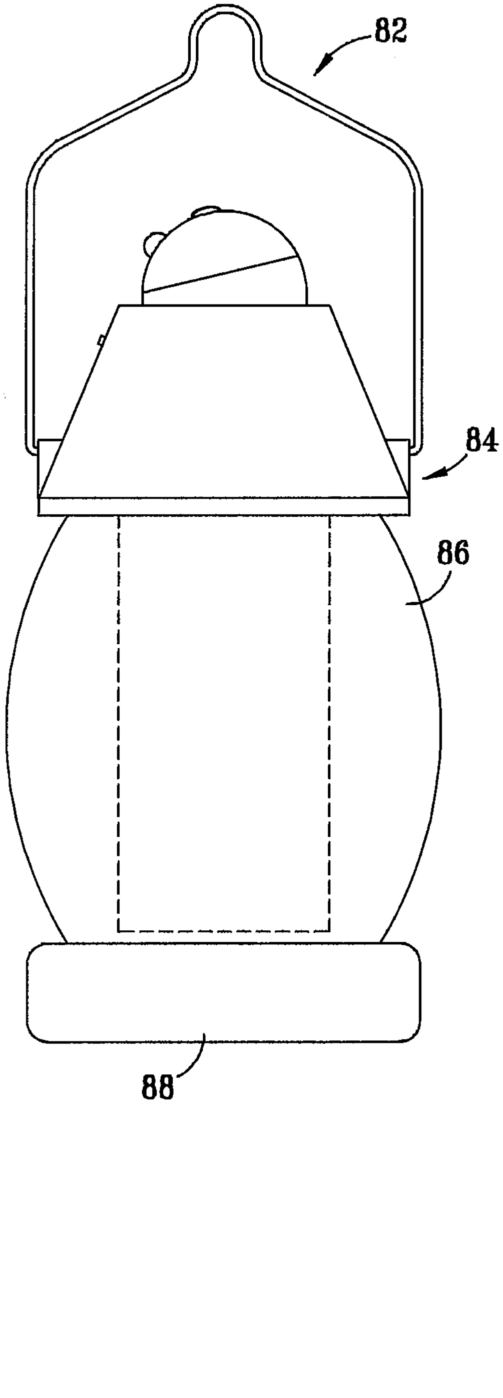
FIG. 7 is a simplified front elevation view of an alternative (round) lantern carrier device with the portable, light-activated mist sprayer system of the invention installed in it.
Figure 8:
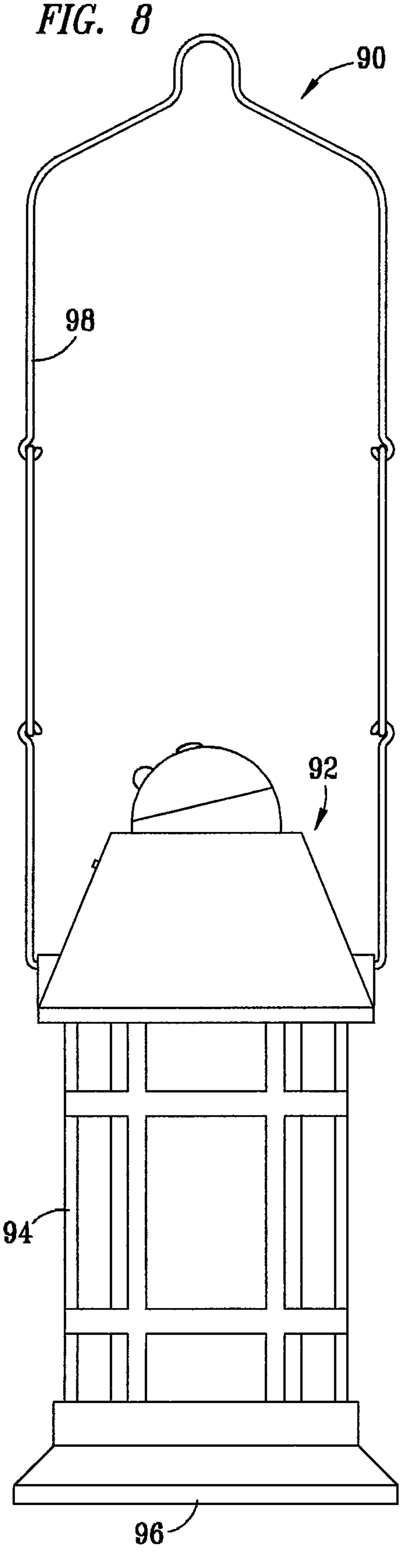
FIG. 8 is a simplified front elevation view of an alternative (hurricane) lantern carrier device with the portable, light-activated mist sprayer system of the invention installed in it.

FIG. 7 depicts a simulated lantern 82 comprising portable, light-activated mist sprayer system 84 as described above installed inside a carrier device comprising round globe 86 supported by base 88. FIG. 8 similarly depicts a simulated hurricane lantern 90 comprising portable, light-activated mist sprayer system 92 as described above installed inside a carrier device comprising protected cylindrical globe 94 supported by base 96, or alternatively, suspended from extended bail 98. It should be appreciated, however, that the simulated torch, lantern and hurricane lantern are simply two of many different types of portable carrier devices into which the self-contained mist sprayer system as disclosed herein can be inserted.

Figure 10:
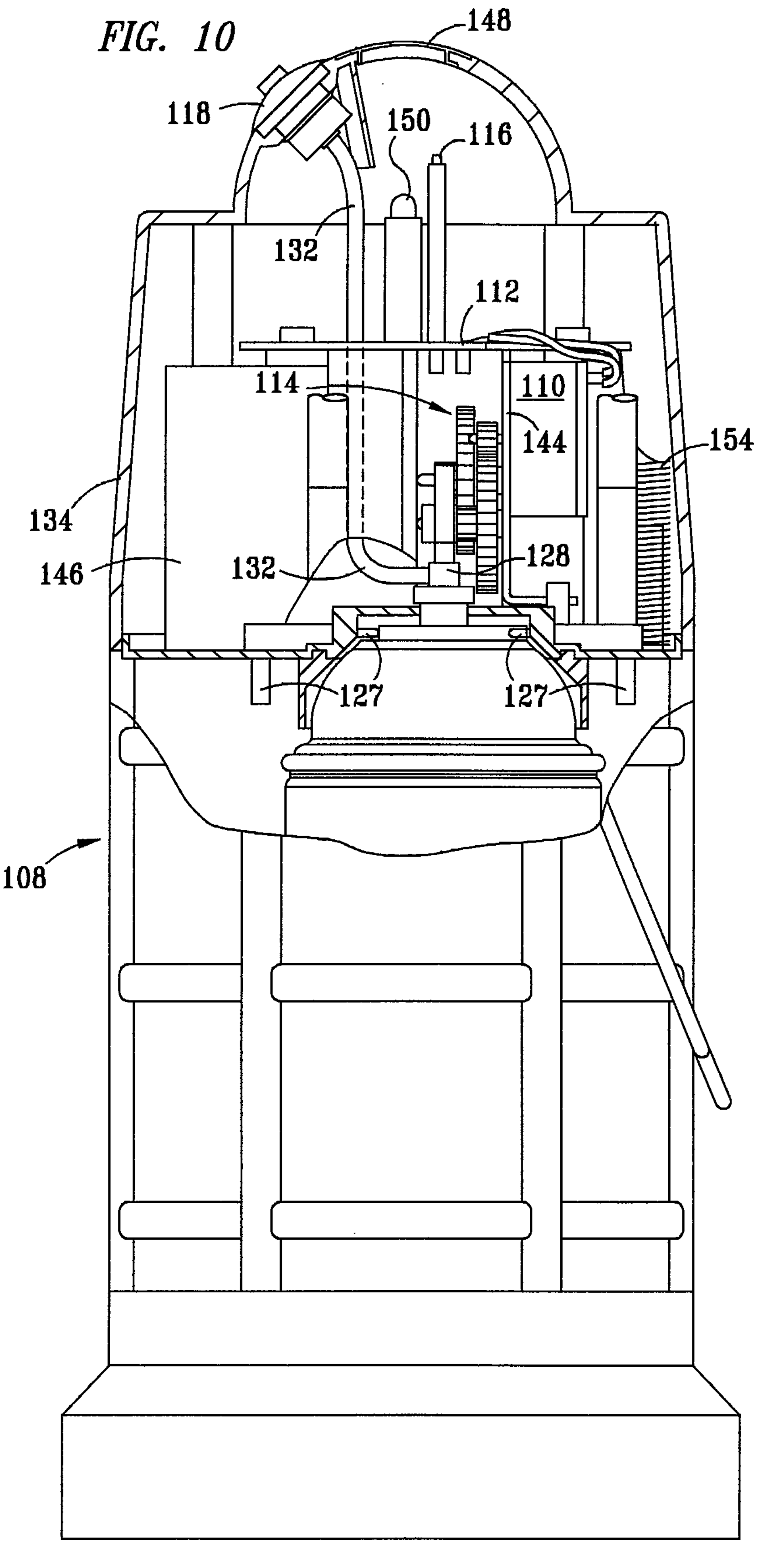
FIG. 10 is a side elevation cross sectional view of another embodiment of the light-activated mist sprayer system involving the use of an aerosol container.
Figure 11:
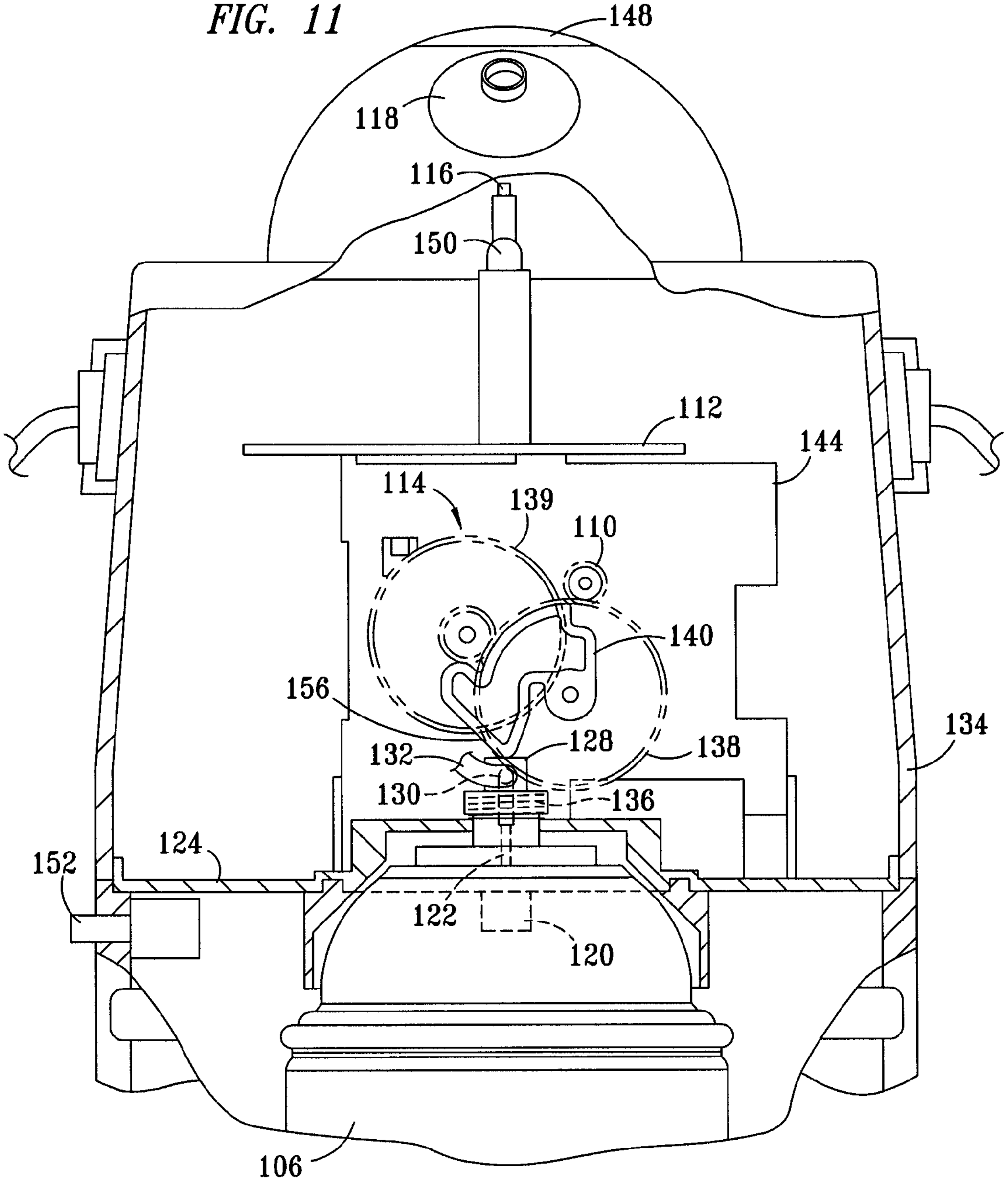
FIG. 11 is a front elevation cross sectional view of the embodiment depicted in FIG. 10, showing the gear mechanism.
Figure 12:
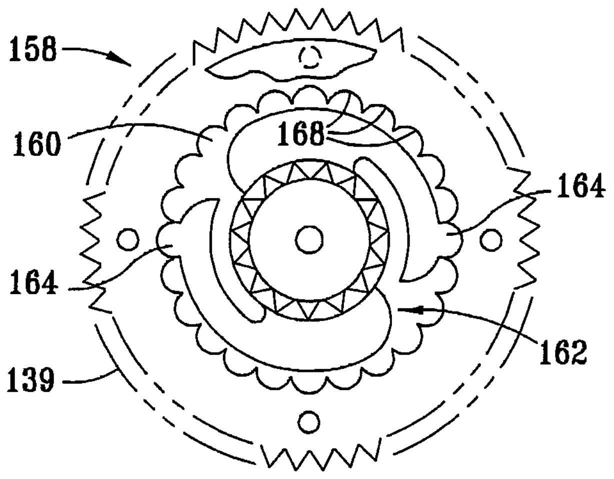
FIG. 12 is a cross sectional view of the clutch gear used in the embodiment depicted in FIGS. 10 and 11.

FIGS. 10-12 depict an alternate embodiment of the simulated lantern depicted in FIG. 8, wherein the portable, light-activated mist sprayer system 104 is configured to be used with an aerosol can 106. Light-activated mist sprayer system 104 is generally composed of housing 108, motor 110, printed circuit board 112, actuator 114, light sensor 116, and nozzle 118. Housing 108 is depicted in FIG. 10 in the form of a hanging lantern, however, as discussed above, it can take on any desired form that is capable of holding aerosol can 106 and the other components of the mist sprayer system 104, such as the torch depicted in FIGS. 1-2 and the lantern depicted in FIG. 7 as well as alternative designs.

Light-activated mist sprayer system 104 is configured to be used to dispense the contents of aerosol can 106. Aerosol can 106 is preferably a standard aerosol can that contains a treatment fluid 30. Treatment fluid 30 is preferably a liquid capable of being dispensed through at least one spray nozzle 118 and into the surrounding air. Treatment fluid 30 can comprise a pesticide, insecticide, or other liquid material that can be dispensed from mist sprayer system 104 to achieve a beneficial purpose. Although a liquid, which can be atomized by spray nozzle 118, is preferred for use as treatment fluid 30, treatment fluid 30 can also be selected from gases, suspensions, and mixtures thereof. Aerosol can 106 has an internal valve 120 shown in FIG. 11) that allows the contents of the can to be released. Pressing down on valve stem 122 serves to activate internal valve 120 allowing the pressurized contents of aerosol can 106 to be released up through valve stem 122. Aerosol cans generally have a cap (not shown) that is used to allow a user to apply downward pressure to valve stem 122 to activate the internal valve and simultaneously direct the exiting contents of aerosol can 106 out through a nozzle that is built into the cap.

Referring to FIG. 11, internal valve 120 can be a metered valve, where pressing down on valve stem 122 allows only a predetermined amount of the contents to exit aerosol can 106 regardless of how long valve stem 122 remains depressed, or it can be an unmetered valve, where the contents of aerosol can 106 continue to exit as long as valve stem 122 remains depressed. While light-activated mist sprayer 104 can be used with aerosol cans 106 that have either metered or unmetered valves, it is preferred that aerosol can 106 has an unmetered valve so that the light activated mist sprayer 104 controls the duration and therefore the amount of treatment fluid 30 that is dispensed.

Aerosol can 106 is located inside housing 108. The top portion of housing 108 is formed by base 124 and dome 134 and can be selectively removed from the remainder of housing 108 to allow aerosol can 106 to be placed within housing 108. Guide 126 is located on the bottom of base 124 to properly position and hold aerosol can 106 within housing 108. Aerosol can 106 is positioned within housing such that ram 128 is seated over valve stem 122. Ram 128 serves the same function as a standard aerosol can cap, namely when downward pressure is applied to ram 128, it pushes down on valve stem 122 to open the internal valve in aerosol can 106. Ram 128 has a channel 130 running through it to allow the contents of aerosol can 106 to pass through ram 128 and into tubing 132 when the internal valve in aerosol can 106 is open. Spring loaded holders 127 can be used to secure the aerosol can 106 in place against base 124 so that the end of valve stem 122 is located in the opening of channel 130. Guide 126 and spring loaded holders 127 are desirably adjustable to accommodate aerosol cans 106 that differ in size. The bottom of housing 108 can further be adjustable in height or one or more separate spacers can be included such that different size aerosol cans 106 are supported from the bottom by housing 108.

The top portion of housing 108 formed by dome 132 and base 134 encloses the mist sprayer assembly portion of light-activated mist sprayer 104. This includes motor 110, printed circuit board 112, and actuator 114, which is further composed of gear 138, clutch gear 139, and translation gear 140. Gears 138, 139, and 140 are all secured to frame 144 within dome 134. Battery compartment 146 is also located within dome 132 and places the batteries in electrical contact with printed circuit board 112. Similarly, light sensor 116 (preferably a cadmium sulfide sensor), three-way switch 152, and LED 150 are also connected to printed circuit board 112, although the wires and electrical connections are not all depicted in order to simplify the drawings.

Light sensor 116 is located adjacent to dome 134. Lens 148 provides a translucent opening in dome 134 to allow ambient light to reach light sensor 116. LED 150 is located adjacent to light sensor 116 below lens 148. LED 150 is controlled by printed circuit board 112 to flash as a warning prior to the activation of motor 110 so that individuals are not unintentionally sprayed with treatment fluid 30. Preferably LED 150 starts flashing a few seconds prior to the activation of motor 110 with the flashing speeding up until LED 150 remains constantly on at which point motor 110 is activated to dispense treatment fluid 30.

Ram 128 is secured over an opening in base 124 while allowing ram 128 to move up and down. Spring 136 is located below ram 128 and above base 124 to bias ram 128 upward away from aerosol can 106. This prevents ram 128 from applying downward pressure to valve stem 122 and opening the internal valve of aerosol can 106 when ram 128 is not being pushed down by translation gear 140. Tubing 132 is secured to the open end of channel 130 at one end and nozzle 118 at the other end to provide a fluid path from the aerosol can 106 to the spray nozzle 118.

Figure 13:
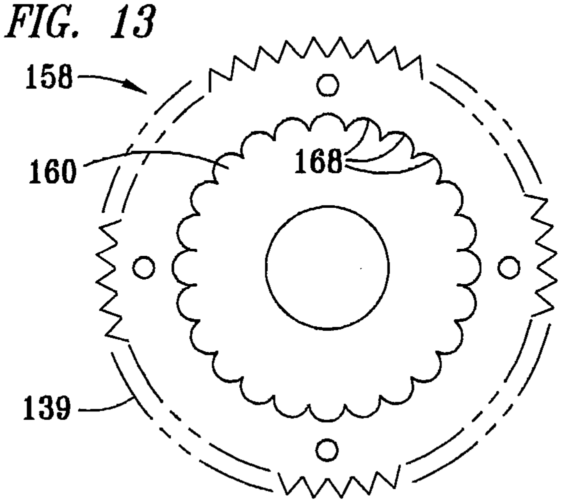
FIG. 13 is a top plan view of the outer portion of the clutch gear depicted in FIG. 12.
Figure 14:
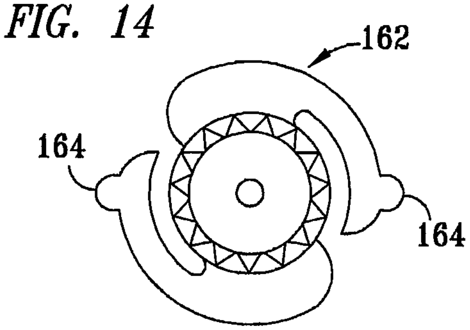
FIG. 14 is a top plan view of the inner portion of the clutch gear depicted in FIG. 12.

When activated by circuit board 112, motor 110 rotates gear 138 which in turn rotates clutch gear 139. Gear 139 rotates translation gear 140, which has a shoulder 156. As translation gear 140 rotates, shoulder 156 presses down on ram 128 to dispense treatment fluid 30 from aerosol can 106. Gear 139 further contains a clutch system 158 depicted in FIGS. 12-14. FIG. 12 is a cross sectional view of gear 139, FIG. 13 is a plan view of the outer portion of gear 139, and FIG. 14 is a plan view of the inner gear 162 that is seated inside chamber 160 inside gear 139. Clutch system 158 is composed of a chamber 160 in gear 139 and an inner gear 162 that has two resilient fingers 164 that is seated in chamber 160. Resilient fingers 164 are biased to seat in notches 168 along the outer periphery of chamber 160.

Clutch system 158 prevents motor 110 from applying too much torque to translation gear 140. Applying too much torque to gear 140 could result in gear 140 rotating so far that its teeth no longer mesh with gear 139 or result in damaging motor 110 from trying to rotate gears when shoulder 156 is pressed against ram 128 and translation gear 140 cannot rotate any further. In clutch system 158, gear 138 meshes with teeth on the exterior of gear 139 so that it is rotated by motor 110. In contrast, gear 140 meshes with teeth on inner gear 162. When the torque levels get too high, such as when shoulder 156 cannot further depress ram 128, fingers 164 of inner gear 162 are pushed inwards and out of notches 168 and skip in to the next notch 168. This allows the outer portion of gear 139 to rotate without rotating inner gear 162 and thus without further rotating gear 140. Fingers 164 then engage the next notch 168 so that inner gear 162 once again rotates in connection with the outer portion of gear 139. Fingers 164 sequentially engage and skip out of notches 164 to limit the torque applied by gear 139 to gear 140.

At the end of the dispensing cycle, current is cut off to motor 110. Without current being applied to motor 110, gears 138, 139, and 140 are allowed to freely rotate. Since shoulder 156 is no longer pushing down on ram 128, the force of spring 136 is able to return ram 128 back to its starting position. Raising ram 128 removes the downward force on valve stem 122, allowing the internal valve in aerosol can 106 to close and stop additional treatment fluid 30 from exiting aerosol can 106 and being dispersed by nozzle 118.

The simplified flowchart of FIG. 9 also illustrates diagrammatically the various components and logic implemented in a preferred electronic control unit installed on printed circuit board 112 and suitable for use in the portable, light-activated mist sprayer system 104 that is depicted in FIGS. 10-12, with the exception that 102 is the motor control module instead of the pump control module as in the earlier described embodiments. It will also be appreciated that other similarly effective circuitry and components can likewise be used in implementing the operational objectives of the system. As shown in FIG. 9, printed circuit board 112 is made up of a light level discrimination section 100 and a motor control module 102. Referring to FIG. 10, an electrical signal received from light sensor 116, a conventional, commercially available device, is received into an optical coupler. The signal is then split and fed through two parallel hysteresis detectors to insure that motor 110 is not activated by transient signals attributable to stimuli other than a gradual darkening or lightening of ambient light to a predetermined "trigger" level. So-called "dusk" and "dawn" discriminators then compare the signal being received from light sensor 116 to predetermined signal values consistent with "dusk" and "dawn" ambient light conditions.

Figure 15:
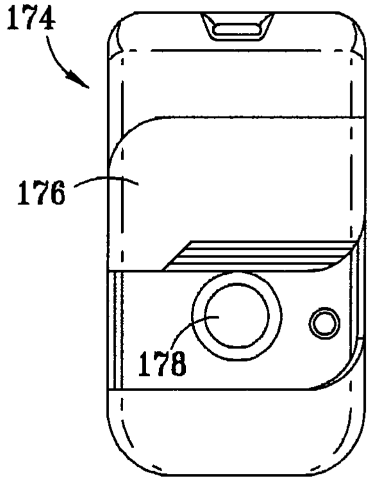
FIG. 15 is a front elevation view of a remote control for the light activated misting system.
Figure 16:
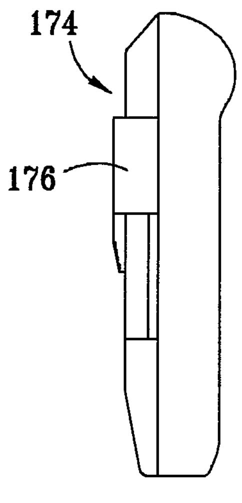
FIG. 16 is a side elevation view of the remote control depicted in FIG. 15.

Parallel nand gates receive the signals from the discriminators, and assuming that the motor start criteria have been met, signal motor controller module to start motor 110. Three-way switch 152 can be provided for use in turning battery power to light sensor 116 as well as an RF receiver 154 if present on or off or activate a test circuit. When system 104 is powered up, motor 110 can be activated either by light sensor 116 or by an RF signal received by RF receiver 154 from an optional remote transmitter 174, shown in FIGS. 15 and 16. Remote transmitter 174 contains button 178 used to send an RF signal to RF receiver 154 and cover 176 that can be slid over button 174 to prevent the accidental activation of system 104.

Circuit board 112 can also be programmable if desired. For example, light level discrimination section 100 can be programmed to increase or decrease the sensitivity to accommodate individual preferences, local lighting conditions, and minor variations in local insect population activity. Circuit board 112 can also be programmed to include a timer to trigger the dispensing of treatment fluid at set times or at set intervals in addition to light sensor 116 or as an alternative option that may be selected using switch 152.

Ambient light sensor 116 is desirably positioned so that it is not blocked from receiving the prevailing ambient light by trees, overhangs, screening structures, or the like, although it is not necessary that it be positioned to receive direct light from the sun or another light source. When positioning portable mist sprayer system 104 and light sensor 116, care should also be given to avoiding locations where flood lights, car lights, or the like, are likely to impinge directly on the sensor, thereby impeding the ability of the sensor to monitor the prevailing ambient light conditions.

Although the use of batteries is disclosed herein as the electrical energy source for the preferred embodiment of the invention, it will be appreciated that solar cells or other sources of power can also be use to power such portable, light-activated mist sprayer systems if desired.

The disclosed light activated mist sprayer systems can further contain numerous additional features. For example, a motion sensor can be used to prevent or delay the release of treatment fluid 30 when individuals or pets are moving in close proximity to the spray nozzles 58 or 118. Similarly, a rain or wind sensor can be used to delay or prevent the release of treatment fluid 30 during conditions where rain or wind will significantly lessen its effectiveness or flying insects are less likely to be active. While a number of the disclosed light activated mist sprayer systems are in the form of simulated lanterns or torches, another alternative is to include a light in the base of the fixture disclosed in FIG. 7, 8, or 10 such that the device can also operate as a lantern.

A number of alternative warning systems can be used to prevent accidental contact of individuals with treatment fluid 30. While FIGS. 10-11 depict the use of LED 150 in close proximity with light sensor 116, alternate locations are also contemplated. For example, if the light activated mist sprayer is to be hung where LED 150 would not be easily visible through lens 148, it would be advantageous to position LED 150 lower. One possible way of doing this is use LED 150 to light up a translucent ring around a portion of the light activated mist sprayer, so that the warning light is visible from any angle. Another alternative is to use a buzzer with or as an alternative to LED 150 to provide an audible warning prior to releasing treatment fluid 30.

Spray nozzle 58 and 118 are generically disclosed. It is expressly contemplated that nozzles 58 and 118 can be flexible nozzles that can be manually redirected. Alternatively, they can have multiple ports to form a multi-angled nozzle or multiple nozzle heads can be used to dispense treatment fluid 30 over a broader area. Nozzles 58 and 118 can also be rotatably mounted, such as disclosed in FIG. 3 to allow either manual or motorized rotation of the nozzles. Nozzles 58 and 118 can be repositioned to provide the optimal directional dispersion of treatment fluid 30 or motorized rotation can be used to dispense treatment fluid 30 over a greater area.

While the disclosed light activated misting systems can be used individually, a group of units can be used to provide protection for a larger area. When multiple units are used a single remote 170 can optimally be used to simultaneously manually activate a number of light activated mist systems. In addition or as an alternative to remote 170, the light activated misting system can be voice or sound activated by using a microphone coupled with a sound interpretive circuit to prevent unintentional activation.

The light activated misting system has been discussed in connection with the use of a treatment fluid 30 to repel or kill flying insects, such as mosquitoes. However, the disclosed system is also useful for disposing of other treatment fluids 30. For example, various types of repellants can be used to repel birds or squirrels especially when used in connection with a motion sensor to manually dispense treatment fluid 30. Treatment fluid 30 may also be various types of disinfectants, sanitizers, deodorizers, or fragrances. The light activated misting system can also be used as a remote lubricator for things like garage doors and chains, where regular dispensing of lubricants is desired. Similarly, the light activated mist sprayer can be used to dispense an anti-static treatment fluid to prevent static build up on computer and other electronic equipment. The light activated mist sprayer can also be used to regularly dispense treatment fluid 30 for the treatment of a septic tank. Other uses for the light activated mist sprayer will become apparent to those of skill in the art through routine development.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventors are legally entitled.

We claim:

1. A portable fluid mist sprayer system for use with an aerosol container having an internal valve and containing a treating fluid, the system comprising:

a housing with a dome and a dome base, wherein the dome is rotatable relative to the dome base to selectively adjust a direction of spray;

a self-contained electrical power source;

at least one spray nozzle and at least one ambient light sensor disposed in the dome, wherein the at least one spray nozzle is rotatable with the dome relative to the dome base;

the at least one spray nozzle being configured to receive the treating fluid from the aerosol container and selectively discharge the treating fluid in the form of a mist;

at least one flow conduit providing fluid communication between the aerosol container and the at least one spray nozzle;

a motor adapted to selectively actuate the internal valve in the aerosol container; and an electronic control unit programmed to activate the motor to initiate a flow of pressurized treating fluid to the at least one sprayer head in response to sensed ambient light of predetermined intensity and duration that occur at dusk and dawn;

wherein the system is configured to prevent activation of the at least one spray nozzle by transient signals received from the at least one ambient light sensor.

2. The portable fluid mist sprayer system of claim 1 wherein the treating fluid is selected from liquids, gases, suspensions, and mixtures thereof.

3. The portable fluid mist sprayer system of claim 2 wherein the treating fluid is selected from the group consisting of insecticide, pesticide, fungicide, biocide, insect repellent, water, air, or mixtures thereof.

4. The portable fluid mist sprayer system of claim 2 wherein the treating fluid comprises an insecticide.

5. The portable fluid mist sprayer system of claim 1 wherein the electronic control unit further comprises an RF receiver.

6. The portable fluid mist sprayer system of claim 1 wherein the electronic control unit comprises a light level discrimination module further comprising an optical coupler, a hysteresis detector, dusk and dawn timing discriminators, and a logic gate communicating with the motor control module.

7. The portable fluid mist sprayer system of claim 1 wherein the electrical power source is at least one battery.

8. The portable fluid mist sprayer system of claim 1 wherein the electrical power source is a solar cell.

9. The portable fluid mist sprayer system of claim 1 further comprising a three-way switch.

10. The portable fluid mist sprayer system of claim 1 wherein the motor is activated in response to ambient light conditions as sensed by the at least one ambient light sensor.

11. The portable fluid mist sprayer system of claim 10, further comprising a frame supporting the motor and the aerosol container.

12. The portable fluid mist sprayer system of claim 1, in combination with a portable carrier device.

13. The portable fluid mist sprayer system of claim 12 wherein the carrier device is a simulated torch, lamp or lantern.

14. The portable fluid mist sprayer system of claim 1 further comprising at least one light source.

15. The portable fluid mist sprayer system of claim 14 wherein the at least one light source is an LED.

16. The portable fluid mist sprayer system of claim 14 wherein the at least one light source is a warning light.

17. The portable fluid mist sprayer system of claim 1, further comprising a gear-driven actuator with a clutch system.

18. The portable fluid mist sprayer system of claim 1 wherein the spray direction is adjustable radially.

19. The portable fluid mist sprayer system of claim 1 wherein the spray direction is angularly adjustable in the vertical direction.

20. The portable fluid mist sprayer system of claim 1 wherein the dome base is inclined.

21. The portable fluid mist sprayer system of claim 1 wherein a washer is disposed between the dome and the dome base.

* * * * *